2 Sheets—Sheet 1.

J. C. BIRDSELL.

Machine for Hulling and Thrashing Clover.

No. 1,299.

Reissued April 8, 1862.

N. PETERS, Photo-Lithographer, Washington, D. C.

J. C. BIRDSELL. 2 Sheets—Sheet 2.

Machine for Hulling and Thrashing Clover.

No. 1,299.

Reissued April 8, 1862.

N. PETERS, Photo-Lithographer, Washington, D. C.

UNITED STATES PATENT OFFICE.

JOHN C. BIRDSELL, OF RUSH, NEW YORK.

IMPROVEMENT IN MACHINERY FOR HULLING AND THRESHING CLOVER.

Specification forming part of Letters Patent No. 20,249, dated May 18, 1858; Reissue No. 1,299, dated April 8, 1862.

*To all whom it may concern:*

Be it known that I, JOHN C. BIRDSELL, of West Henrietta, Monroe county, and State of New York, have invented a new and useful machine for thrashing clover, to separate the seed, hull, and clean it at one operation, or in one machine, of which the following is a specification.

Prior to my invention clover was thrashed by a machine which only separated the seed with the hulls on it from the straw and heads, and the seed was taken, by manual labor, and put into another machine of a different construction to remove the hulls and clean the seed.

The object and purpose of my invention and improvements have been to make a machine which would thrash the clover and separate the seed from straw or stalks and heads, remove the hulls from the seed, and clean it ready for use or market, and I have succeeded in making a machine which will thrash, hull, and clean more than twice, and nearly three times, as fast as it has been done heretofore with the same or a given quantity of labor and power.

The nature of my invention and improvements in machines for thrashing clover, and hulling and cleaning the seed, consists in arranging and combining in one machine the cylinder which thrashes the bolls and seed from the straw or stalks and the cylinder which hulls the seed, so that the bolls and seed thrashed may be separated from the straw or stalks, and conveyed from the thrashing to the hulling cylinder, and the seed hulled before it passes out of the machine, and in combining with the above a bolting or screening and conveying apparatus to separate the bolls and seed from the straw or stalks and deliver them to the hulling-cylinder; also, in combining with the thrashing and hulling cylinders a screening and fanning apparatus to separate the hulls or bolls and clean the seed after it leaves the hulling-cylinder.

To enable others skilled in the art to make and use the machine which I have invented. I will proceed to describe its construction and the mode of using it, referring to the accompanying drawings, in which the same letters of reference indicate like parts in each of the figures.

Figure 1:
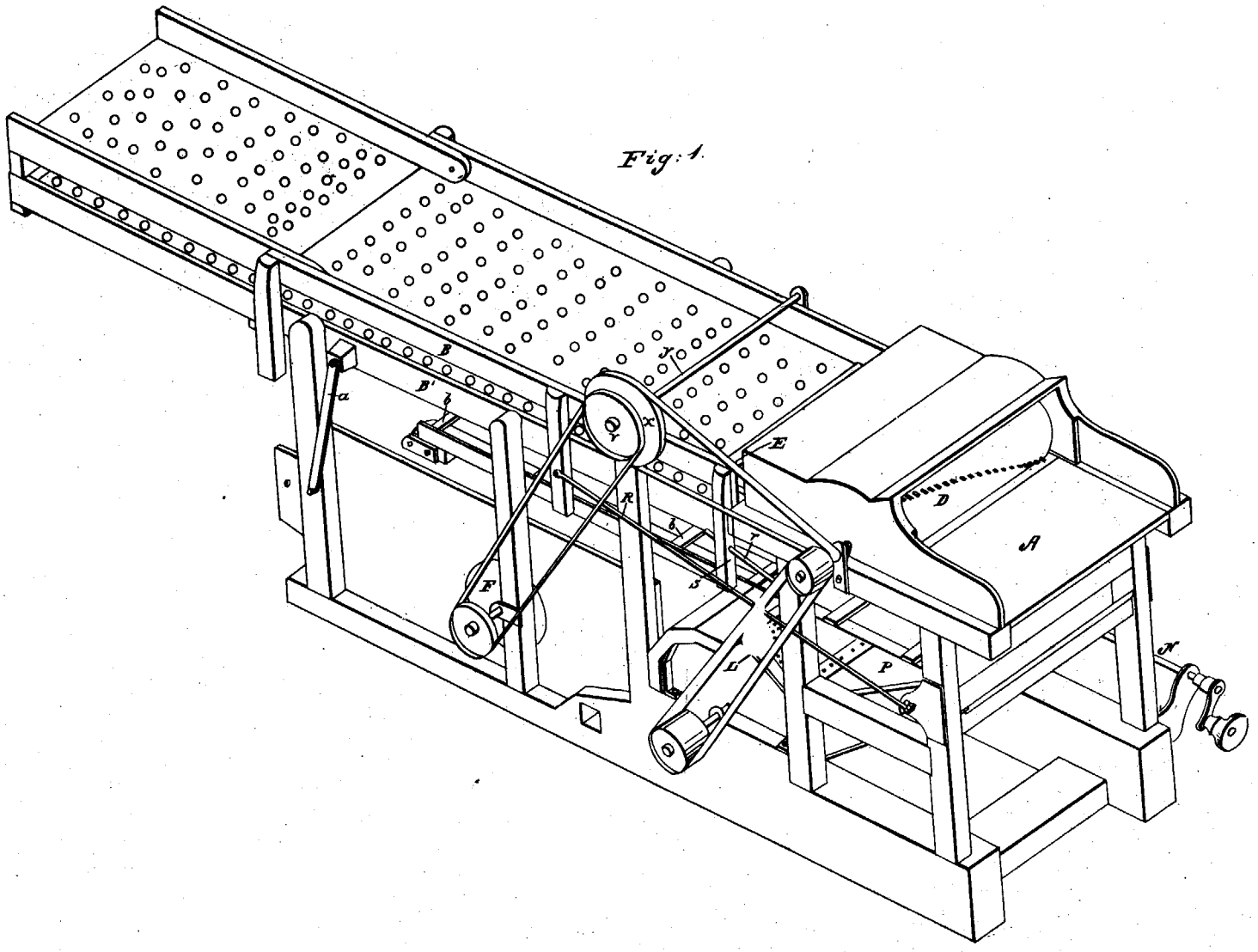
Figure 2:
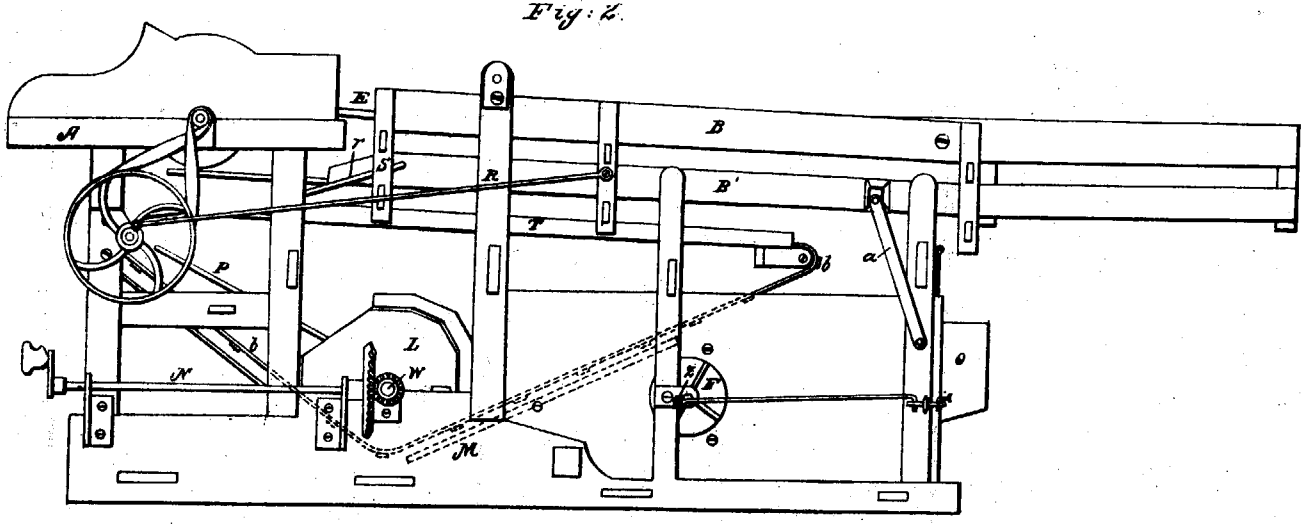
Figure 3:
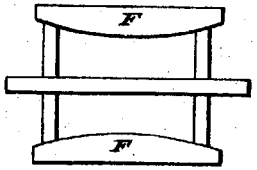

Figure 1 is a perspective view of the machine. Fig. 2 is an elevation of one side. Fig. 3 is a section of the machine cut perpendicularly lengthwise through the center.

In these drawings, C C are the side sills, about ten feet long, connected by the cross-sills C′ C′, about three feet in length, to make a strong frame for the base of the machine. The posts G G are firmly fastened to the sills C C, and are connected by the girders H H, and two of them by the side bars, H′. The rails A′ are fastened to the tops of the posts, and support the journal-boxes for the shaft of the thrashing-cylinder D, which cylinder has four rows of teeth set spirally on its surface, as shown in Fig. 1. These teeth are set about two inches from center to center, and the projecting ends are flattened to make them wedge-shaped. These teeth take the clover-stalks from the feed-board A, fastened to the rails A′, and carry them up, as indicated by the arrow, under the concave I, which is provided with three rows of teeth about one inch from center to center lengthwise of the concave. As the teeth in the concave are only half as far apart as the teeth in the cylinder the latter are so arranged as to pass alternately through the spaces between the teeth in the concave. The concave is supported by the casing at the ends of the cylinder. The vibrating board or apron E is pivoted to the casing near the cylinder, and conducts the thrashed clover onto the upper bolt or screen, B, which is made of thin boards perforated with holes one and one-eighth inches in diameter, and in the same frame, a little distance below the screen B, there is a screen, B′, with holse three-fourths of an inch in diameter. These screens are connected by the frames S S, and the rear end is supported by the links *a a*, and the front end by the rods *r r*, which are inclined so that when the screen moves toward the thrashing-cylinder it descends and slips forward under the straw, and rises as it moves back, carrying the straw from the thrashing-cylinder, and it passes off at the end of the screen, while the bolls and seed pass through the screen onto the table T, which is supported by the cross-girders H H. These screens are traversed by the rods R R from the cranks of the shaft J, which turns in boxes fastened to the posts G G, and is carried by a band from the pulley 5 on the cylinder-shaft to the pulley 6 on the shaft J. The endless belt of slats *b b* passes around the roller K, at the end of the table T, and over pulleys on the shaft J, which operate it, and under pulleys on studs in the sills *c'*, one of which is shown at K'. This belt of slats carries the bolls and seed off of the table T onto the inclined feed-board P, which conducts the bolls and seed onto the pulley-cylinder L. The shaft of this cylinder turns in boxes fastened to the frame, and it may be provided with a pulley or gear to turn it and operate the machine, as the pulley 1 on this shaft carries a band to the pulley 2 on the thrashing-cylinder. The cylinder L is covered with iron roughened like a rasp—such as is used for smoothing wood or trimming the hoofs of horses—and case-hardened. It is provided with a concave of iron with a rasp-surface, similar to the cylinder L, and the bolls and seed fed to the cylinder by the board P are carried up, as indicated by the arrow, and over between the cylinder and concave, which separate the bolls from the seed and both fall onto the board M and are carried up by the belt of slats *b b*, and pass onto the screens of woven wire Q Q in the shoe O, which screens separate the hulls from the seed, which passes through them, while the hulls pass off at the end of the screen. The front end of the shoe is hung on the pivot *d* fastened to the bar *e*, which is supported by the side casings, *f f*. The rear end of the shoe is hung on the links *g g*. The shoe and screens are vibrated by the connecting-rods and belt-cranks, which connect it to the crank on the shaft of the fan F, (as shown in Fig. 2.) The shaft of the fan F turns in boxes fastened to the posts G, and is turned by the pulley 4, with a belt from the pulley V on the shaft *y*, which turns in boxes on the tops of the posts G G, which shaft is turned by the pulley *x*, with a belt from the pulley 3 on the thrashing-cylinder shaft. The case F' around the fan compels the bolls to pass between the end of the board M and the screen, so as to pass among the seed; and the blast also passes between the screens and under the lower screen between the falling seed. The teeth on the rasp-cylinder and concave project about one-sixteenth of an inch from the surface of the iron, and the concave should be set so that the points of the teeth will be about one-eighth of an inch from the points of the teeth on the cylinder where the seed enters between them, and the points of the teeth should be about one-sixteenth of an inch apart where the seed passes out onto the board M, which is supported by the bar M' fastened to the casings or boards *f f*. The bolls and seed which pass through the screen beyond the table T fall with the chaff beyond the screens Q Q, and may be rethrashed, hulled, and screened. The screens B B' may be made to swing over onto each other, as shown by dotted lines in Fig. 3.

I contemplate that skillful artisans may modify my improvements in various ways and retain the merits and principles which I have invented or discovered and carried out in practice.

I transverse the screens B and B' so fast that they slip forward under the straw as they descend, and as they rise or move back they lift the straw and carry it back, and, this operation being continued, the straw passes off at the rear end of the screens.

I believe I have described and represented the machine which I have invented for thrashing clover and hulling the seed so as to enable any person skilled in the art to make and use it. I will now state what I desire to secure by Letters Patent, to wit:

I claim—

1. The arranging and combining in one machine the cylinder which thrashes the bolls and seed from the straw or stalks and the cylinder which hulls the seed, so that the bolls and seed thrashed may be hulled before it (the seed) passes out of the machine.

2. In combination with the thrashing and hulling cylinders above claimed, the bolting or screening and conveying apparatus, which separates the bolls and seed from the straw or stalks and delivers them to the hulling-cylinder.

3. In combination with the thrashing and hulling cylinders, the screening and fanning apparatus, which separates the hulls or bolls and cleans the seed after it leaves the hulling-cylinder.

JOHN C. BIRDSELL.

Witnesses:
J. DENNIS, Jr.,
W. THOMPSON.